(12) United States Patent
Kim et al.

(10) Patent No.: US 8,608,976 B2
(45) Date of Patent: Dec. 17, 2013

(54) PHOTO ALIGNMENT MATERIAL AND METHOD OF MANUFACTURING DISPLAY SUBSTRATE USING THE SAME

(75) Inventors: Hoi-Lim Kim, Seoul (KR); Hyun-Ku Ahn, Hwaseongi-si (KR); Jun-Woo Lee, Anyang-si (KR); Sung-Yi Kim, Gwangju-si (KR)

(73) Assignee: Samsung Display Co., Ltd. (KR)

( * ) Notice: Subject to any disclaimer, the term of this patent is extended or adjusted under 35 U.S.C. 154(b) by 1113 days.

(21) Appl. No.: 12/400,854

(22) Filed: Mar. 10, 2009

(65) Prior Publication Data

US 2009/0258158 A1   Oct. 15, 2009

(30) Foreign Application Priority Data

Apr. 15, 2008   (KR) .................. 10-2008-0034707

(51) Int. Cl.
*C09K 19/56*   (2006.01)
(52) U.S. Cl.
USPC ........................................ 252/299.4; 428/1.2
(58) Field of Classification Search
USPC .................. 252/299.4; 428/1.2, 1.25, 1.26
See application file for complete search history.

(56) References Cited

U.S. PATENT DOCUMENTS

| 8,173,749 B2 * | 5/2012 | Bachels et al. ............... 525/200 |
| 2008/0293888 A1 * | 11/2008 | Bachels et al. ............... 525/200 |
| 2009/0237603 A1 * | 9/2009 | Takeshita et al. ............ 349/123 |

FOREIGN PATENT DOCUMENTS

| JP | 2007-248637 | 9/2007 |
| KR | 1020070004025 A | 1/2007 |
| KR | 1020070116562 A | 12/2007 |
| WO | WO 2007071091 A1 * | 6/2007 |
| WO | WO 2008135131 A1 * | 11/2008 |
| WO | WO 2008145225 A2 * | 12/2008 |

\* cited by examiner

*Primary Examiner* — Shean C Wu
(74) *Attorney, Agent, or Firm* — Cantor Colburn LLP

(57) ABSTRACT

A photo alignment material includes a photo alignment polymer and an organic solvent. The photo alignment polymer is prepared by polymerizing a diamine monomer including at least two photo reactive parts represented by the following Chemical Formula 1.

<Chemical Formula 1>

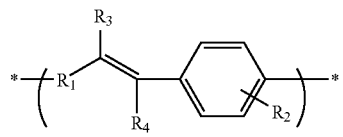

In Chemical Formula 1, $R_1$ represents $-(CH_2)_n-$, $-O(CH_2)_n-$ or

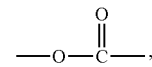

$R_2$, $R_3$ and $R_4$ each independently represent $-H$, $-O(CH_2)_{m-1}-CH_3$ or

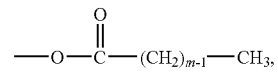

and n and m independently represent an integer of from 1 to 8. Thus, change of the orientation of the alignment layer due to the action of an electric stress may be prevented and/or reduced. Therefore, an after—image may be reduced, and display quality is improved.

7 Claims, 6 Drawing Sheets

PHOTO ALIGNMENT MATERIAL AND METHOD OF MANUFACTURING DISPLAY SUBSTRATE USING THE SAME

This application claims priority to Korean Patent Application No. 2008-34707, filed on Apr. 15, 2008, and all the benefits accruing therefrom under 35 USC §119, the contents of which are incorporated herein by reference in their entirety.

BACKGROUND OF THE INVENTION

1. Field of the Invention

This application relates to a photo alignment material and a method of manufacturing display substrate using the same. More particularly, this application relate to a photo alignment material that may be used for manufacturing an alignment layer of a liquid crystal display device and a method of manufacturing display substrate using the same.

2. Description of the Related Art

Generally, liquid crystal display ("LCD") panels include in their construction an array substrate having switching devices for driving pixels, an opposing substrate facing the array substrate and a liquid crystal layer interposed between the array substrate and the opposing substrate. A voltage applied to the liquid crystal layer of the LCD panel controls the transmittance of light through the LCD panel and thence through selected pixels, to allow the display of an image.

A liquid crystal material interposed between the substrates forms the liquid crystal layer. In addition, an alignment layer is formed on each of the opposing inner surface of the substrates so as to make contact with and align the liquid crystal material in a desired direction. Alignment layers may be formed by, for example, coating a solution including a polyimide on a surface of the substrate with a printing roller of an alignment layer printing device, and then rubbing to form the alignment layer.

However, the rubbing fabric used in rubbing processes can cause a buildup in static electricity, which can thereby damage patterns on the substrate. Furthermore, the substrate may be contaminated by impurities on or in the rubbing fabric, and visual defects such as blurs may appear on the substrate so that the overall display quality deteriorates. To address the above-mentioned problems, photo alignment methods have been investigated. In photo alignment methods, a photo alignment material is first coated on a surface of a substrate, and then exposed to light. The photo alignment material is thereby photo-decomposed, photo-isomerized or photo-polymerized to form an alignment layer having a predetermined orientation.

Meanwhile, voltage is applied to a pixel electrode and a common electrode of a LCD panel, the alignment layer manufactured by the photo alignment method may be damaged by electric stress. Thus, orientation of the alignment layer may not be maintained uniformly, and the tilted angle of a liquid crystal molecule on the alignment layer may change. Accordingly, a difference in brightness between black and white may be caused in the gray scale level. The brightness difference may be observable as a residual image, thereby deteriorating the display quality.

BRIEF SUMMARY OF THE INVENTION

In an embodiment, a photo alignment material is provided, which is capable of minimizing change of an orientation of an alignment layer to reduce an after-image.

In another embodiment, a method of manufacturing a display substrate using the above-mentioned photo alignment material is also provided.

In an embodiment, a photo alignment material includes a photo alignment polymer and an organic solvent. The photo alignment polymer is prepared by polymerizing a diamine monomer including at least two photo reactive parts, as represented by the following Chemical Formula 1.

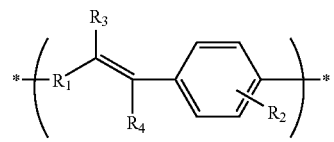

Chemical Formula 1

In Chemical Formula 1, $R_1$ represents $-(CH_2)_n-$, $-O(CH_2)_n-$ or

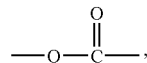

$R_2$, $R_3$ and $R_4$ each independently represent $-H$, $-O(CH_2)_{m-1}-CH_3$ or $$-O-\overset{O}{\underset{\|}{C}}-(CH_2)_{m-1}-CH_3,$$

and n and m each independently represent an integer of from 1 to 8.

In an embodiment, the photo alignment polymer may include a photo reactive part represented by the following Chemical Formula 2.

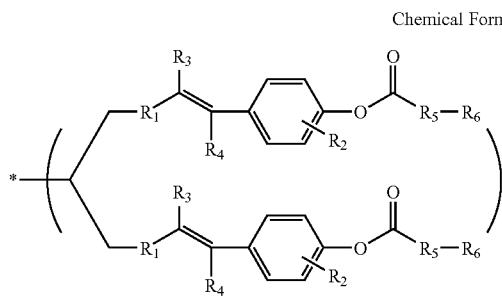

Chemical Formula 2

In Chemical Formula 2, $R_1$ represents $-(CH_2)_n-$, $-O(CH_2)_n-$ or

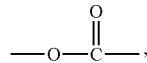

$R_2$, $R_3$ and $R_4$ each independently represent $-H$, $-O(CH_2)_{m-1}-CH_3$ or

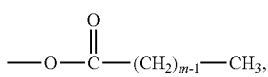

n and m each independently represent an integer of from 1 to 8, $R_5$

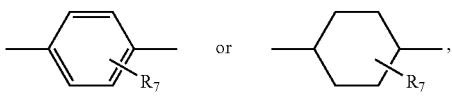

represents $R_7$ represents —H, —O(CH$_2$)$_{a-1}$—CH$_3$ or

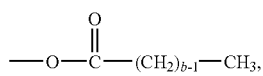

a and b independently represent an integer of from 1 to 8, $R_6$ represents —O(CH$_2$)$_e$—CX$_2$—CY$_3$, X and Y each independently represents a hydrogen atom or a fluorine atom, and e represents an integer of from 1 to 18.

In an example embodiment of the present invention, the photo alignment polymer may include a photo reactive part represented by the following Chemical Formula 3.

Chemical Formula 24

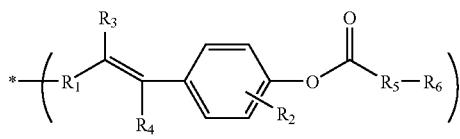

In Chemical Formula 24, $R_1$ represents —(CH$_2$)$_n$—, —O(CH$_2$)$_n$— or

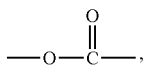

and $R_2$, $R_3$ and $R_4$ each independently represents —H, —O(CH$_2$)$_{m-1}$CH$_3$ or

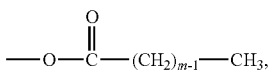

and n and m each independently represents an integer of from 1 to 8, and $R_5$ represents

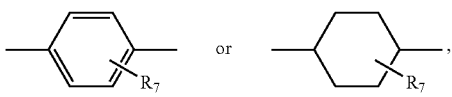

and $R_7$ represents —H, —O(CH$_2$)$_{a-1}$—CH$_3$ or

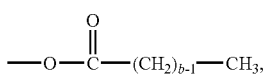

and a and b independently represent an integer of from 1 to 8, and $R_6$ represents —O(CH$_2$)$_e$—CX$_2$—CY$_3$, and X and Y independently represent a hydrogen atom or a fluorine atom, and e represents an integer of from 1 to 18.

According to another embodiment, a method of manufacturing a display substrate is provided. In the method, a pixel unit is formed on a surface of a base substrate. A photo alignment material prepared by polymerizing a diamine monomer is coated on a surface of the base substrate having the pixel unit to form an alignment layer. The base substrate is irradiated with light to cause an intramolecular reaction between photo reactive parts of a photo alignment polymer, and an intermolecular reaction between photo reactive parts of adjacent photo alignment polymers, such that a surface of a resulting alignment layer has an orientation.

According to another embodiment, a method of manufacturing a liquid crystal display is provided, the method comprising forming a first alignment layer comprising: forming a pixel unit on a surface of a first base substrate; coating a photo alignment material comprising a photo alignment polymer prepared by polymerizing a diamine monomer including at least two photo reactive parts represented by Chemical Formula 1 and an organic solvent on a surface of the first base substrate having the pixel unit to form a first alignment layer, and irradiating the first base substrate with light. A second alignment substrate is further formed, comprising forming a plurality of color filters on a surface of a second base substrate; forming a common electrode on a surface of the color filters opposite the base substrate, coating a photo alignment material comprising a photo alignment polymer prepared by polymerizing a diamine monomer including at least two photo reactive parts represented by Chemical Formula 1 and an organic solvent on a surface of the second base substrate having the color filter to form a second alignment layer; and irradiating the second base substrate with light. Manufacturing the liquid crystal display further comprises arranging a face of the first alignment substrate having the first alignment layer opposite a face of the second alignment substrate having the second alignment layer such that a space is formed between opposing faces of the first and second alignment substrates; and interposing liquid crystal molecules in the resulting space between the opposing faces of the first and second alignment substrates to form a liquid crystal display in contact with both the first and second alignment layers. A liquid crystal display prepared by this method is also disclosed.

BRIEF DESCRIPTION OF THE DRAWINGS

The above and other features and advantages will become more apparent by describing in detailed example embodiments thereof with reference to the accompanying drawings, wherein.

DETAILED DESCRIPTION OF THE INVENTION

Figure 1:
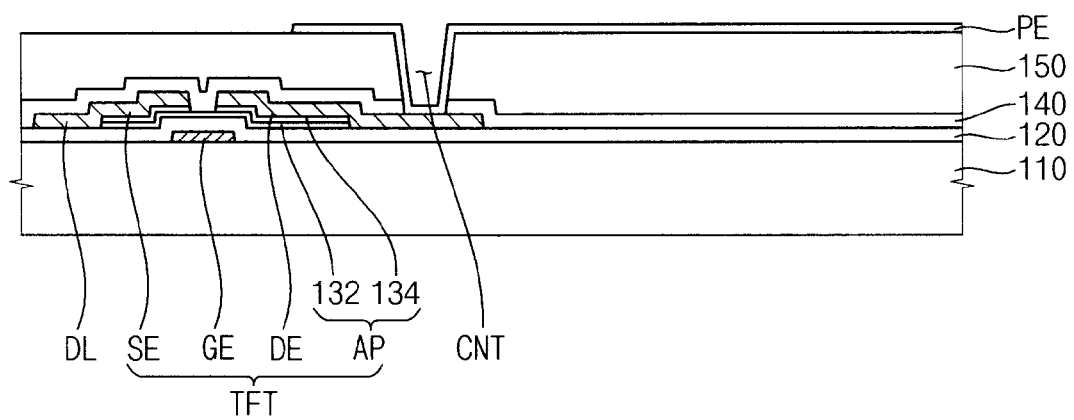
FIGS. 1 and 2 are cross-sectional views illustrating a method of manufacturing an exemplary display substrate according to an embodiment.

The present invention is described more fully hereinafter with reference to the accompanying drawings, in which example embodiments are shown. The present invention may, however, be embodied in many different forms and should not be construed as limited to the embodiments set forth herein. Rather, these example embodiments are provided so that this disclosure will be thorough and complete, and will fully convey the scope to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized embodiments (and an intermediate structures) of the present invention. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A photo alignment material according to an embodiment includes a photo alignment polymer and an organic solvent. The photo alignment polymer is prepared by polymerizing a diamine monomer including at least two photo reactive parts, as represented by the following Chemical Formula 1.

Chemical Formula 1

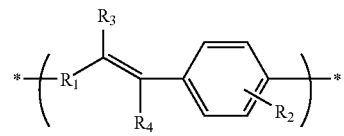

In Chemical Formula 1, $R_1$ represents $—(CH_2)_n—$, $—O(CH_2)_n—$ or

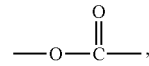

and $R_2$, $R_3$ and $R_4$ each independently represents $—H$, $—O(CH_2)_{m-1}—CH_3$ or

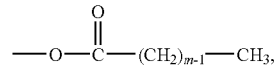

and n and m each independently represent an integer of from 1 to 8.

The photo alignment polymer prepared by polymerizing the diamine monomer includes the photo reactive part represented by Chemical Formula 1. When the photo reactive part is exposed to light, the carbon-carbon double bond between $R_3$ and $R_4$ is broken and adjacent photo reactive parts thereby react with each other (e.g., dimerize) to form a polymer having an orientation. As defined herein, a polymer having an orientation is one in which the main chains, side chains, or both main and side chains collectively or selectively align on a substrate to or against a particular direction, or at a preselected angle to or against a particular direction, where the direction may be defined as a rubbing direction, a photoalignment direction (as provided by a mask or written pattern), or other mechanism for providing the orientation.

A photo alignment polymer according to an embodiment may include a photo reactive part represented by the following Chemical Formula 2.

Chemical Formula 2

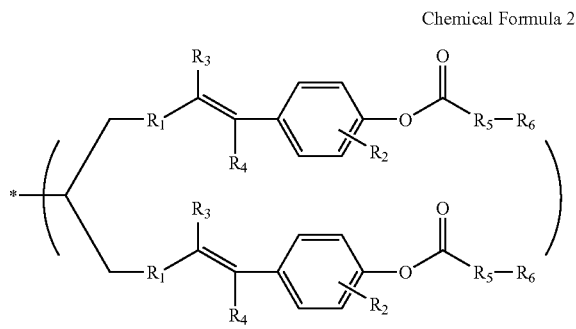

In Chemical Formula 2, $R_1$ represents $-(CH_2)_n-$, $-O(CH_2)_n-$ or

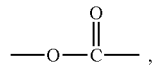

and $R_2$, $R_3$ and $R_4$ each independently represent $-H$, $-O(CH_2)_{m-1}-CH_3$ or

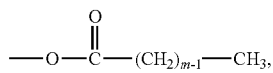

and n and m each independently represent an integer of from 1 to 8, and $R_5$ represents

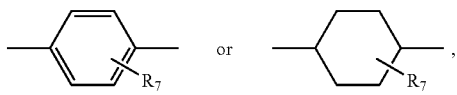

and $R_7$ represents $-H$, $-O(CH_2)_{a-1}-CH_3$ or

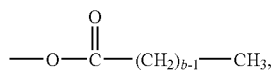

and a and b each independently represent an integer of from 1 to 8, and $R_6$ represents $-O(CH_2)_e-CX_2-CY_3$, and X and Y each independently represents a hydrogen atom or a fluorine atom, and e represents an integer of from 1 to 18.

$R_6$, which is an end of a branch group of the polymer represented by Chemical Formula 2, substantially contributes to aligning a liquid crystal molecule. The branch group may be orientated substantially vertically with respect to a surface of the alignment layer, which is substantially parallel to a substrate. For example, the end of the branch group may be hydrophobic. In an embodiment, the diamine monomer may include at least two of the branch groups.

In Chemical Formula 2, the photo reactive part includes two functional groups each having a carbon-carbon double bond between $R_3$ and $R_4$. Alternatively, an additional (e.g., a third, fourth, etc.) functional group having a carbon-carbon double bond located between $R_3$ and $R_4$ may be coupled to a carbon atom coupled to the functional groups in place of a hydrogen atom so that the photo reactive part may include, for example, three functional groups or more.

Examples of the diamine monomer including the photo reactive part represented by Chemical Formula 2 may include chemical compounds represented by the following Chemical Formulas 3 to 6. These can be used alone or in a combination.

Chemical Formula 3

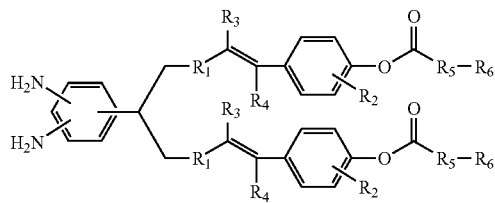

Chemical Formula 4

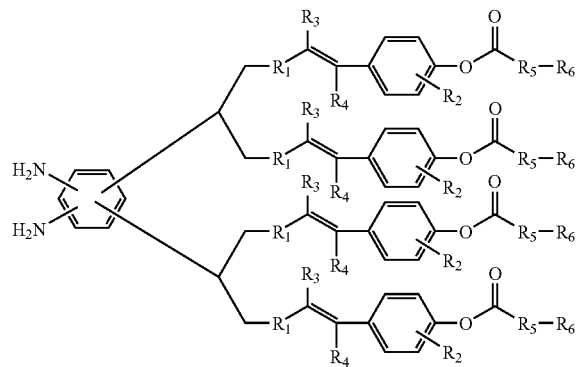

Chemical Formula 5

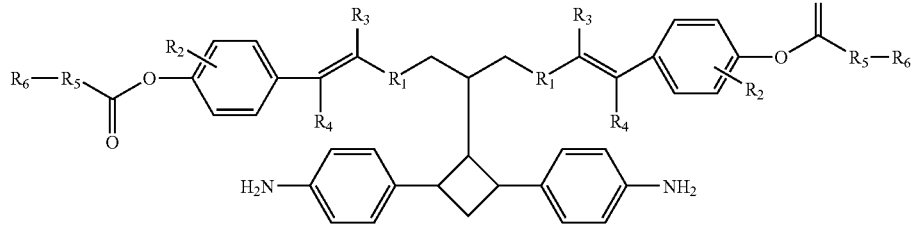

Chemical Formula 6

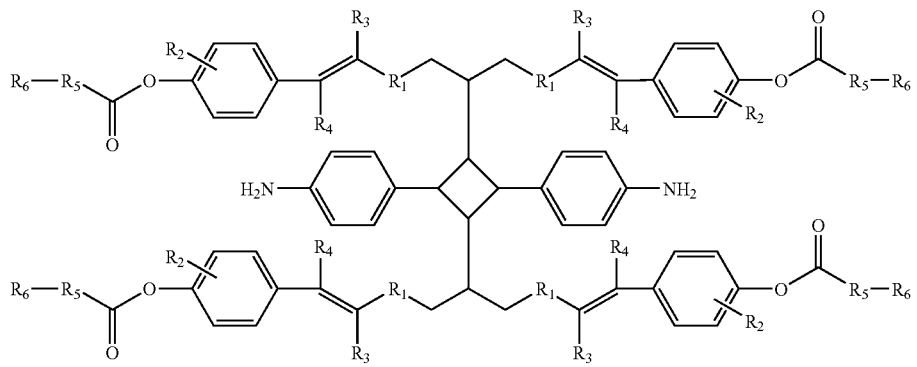

In Chemical Formulas 3 to 6, $R_1$ represents —$(CH_2)_n$—, —$O(CH_2)_n$— or

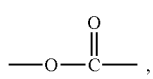, $R_2$, $R_3$ and $R_4$ each independently represent —H, —$O(CH_2)_{m-1}$—$CH_3$ or

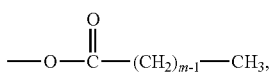, n and m each independently represent an integer of from 1 to 8, $R_5$ represents

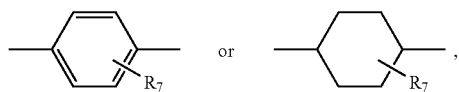, $R_7$ represents —H, —$O(CH_2)_{a-1}$—$CH_3$ or

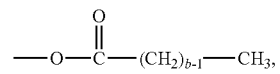, a and b each independently represent an integer of from 1 to 8, $R_6$ represents —$O(CH_2)_e$—$CX_2$—$CY_3$, X and Y each independently represent a hydrogen atom or a fluorine atom, and e represents an integer of from 1 to 18.

In Chemical Formulas 3 and 4, the diamine monomer includes one or two of the photo reactive parts represented by Chemical Formula 2. Alternatively, the photo reactive parts may be coupled to four carbon atoms of the benzene ring depicted in Chemical Formula 2, excluding those carbon atoms of the benzene ring substituted with the two amino groups.

In a specific embodiment, exemplary diamine monomers include chemical compounds represented by the following Chemical Formulas 7 to 11.

Chemical Formula 7

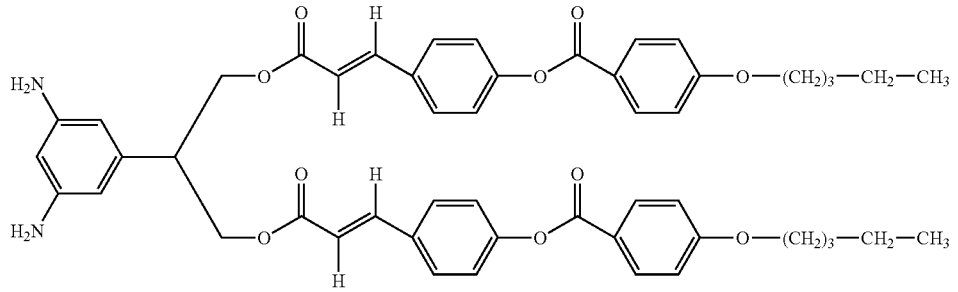

Chemical Formula 8

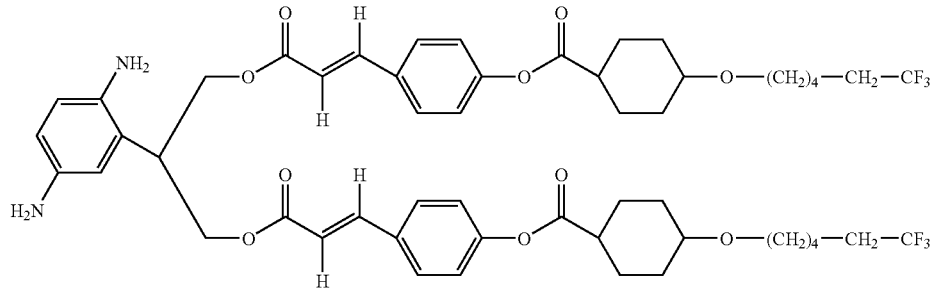

Chemical Formula 9

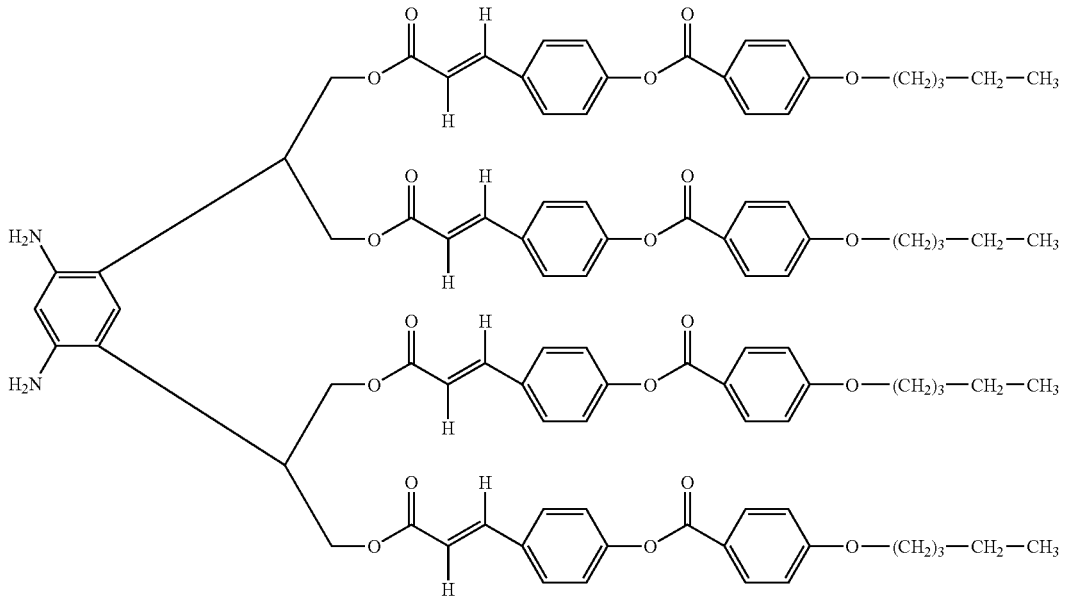

Chemical Formula 10

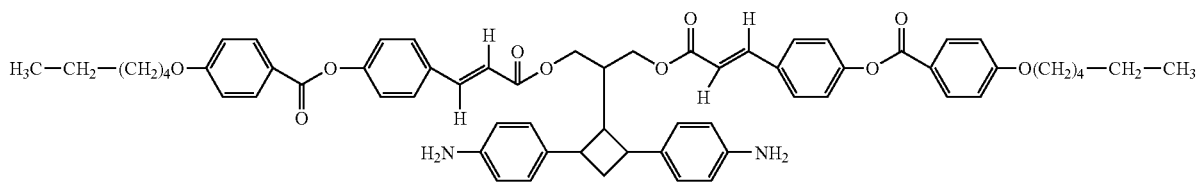

Chemical Formula 11

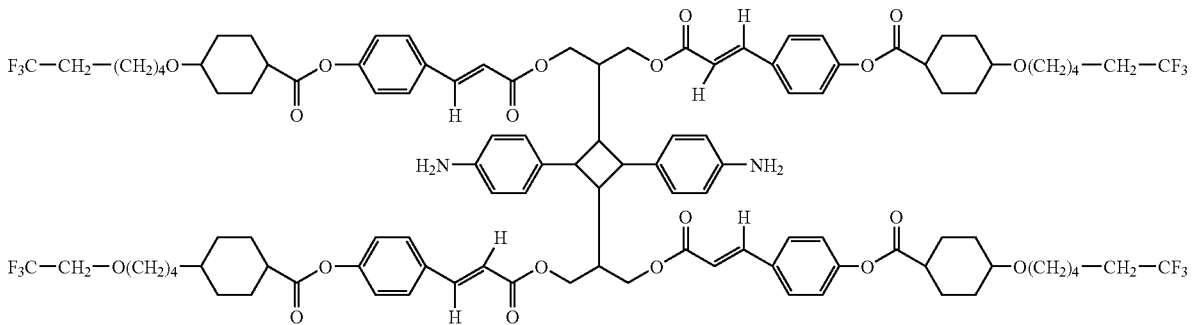

In another embodiment, the photo alignment polymer may be prepared by reacting the diamine monomer with an acid dianhydride.

Examples of the acid dianhydride may include chemical compounds represented by the following Chemical Formulas 12 to 23. These can be used alone or in a combination. However, the examples are not to be construed as limited to the specific embodiments disclosed.

Chemical Formula 12

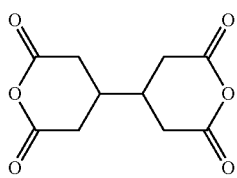

Chemical Formula 13

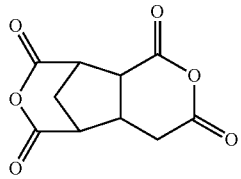

Chemical Formula 14

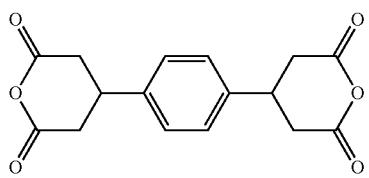

Chemical Formula 15

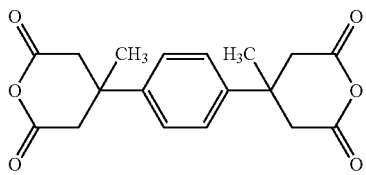

Chemical Formula 16

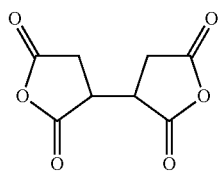

Chemical Formula 17

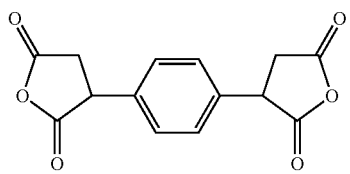

Chemical Formula 18

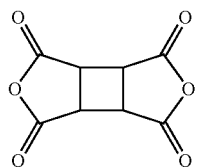

<Chemical Formula 19

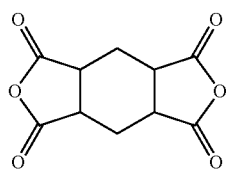

Chemical Formula 20

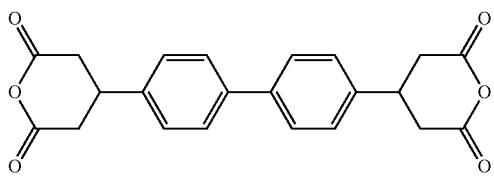

Chemical Formula 21

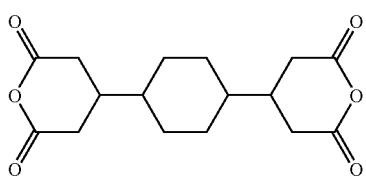

Chemical Formula 22

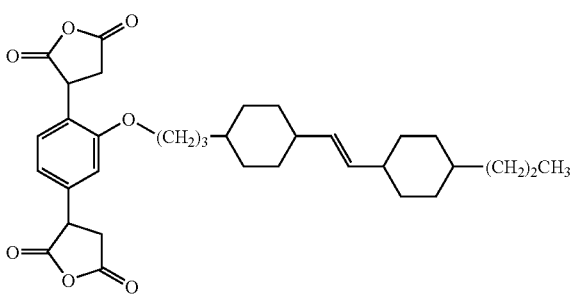

Chemical Formula 23

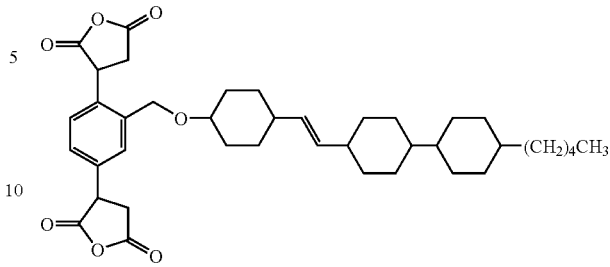

During condensing, an amino group of the diamine monomer reacts with a carbonyl group of the acid dianhydride to form an imide bond, and thereby to form the photo alignment polymer including the photo reactive part as represented by Chemical Formula 1.

In this way, an amino group of the diamine monomer may react with a carbonyl group of the acid dianhydride to form a polyamic acid. The polyamic acid may be further subjected to a partial dehydration ring closure reaction to form an imide bond. For example, to effect imidization, the polyamic acid may be heated or mixed with a dehydration agent and a catalyst for the dehydration ring closure reaction. Examples of dehydration agents may include an acid anhydride such as acetic anhydride, tri-fluoroacetic anhydride, propionic anhydride, and the like. Examples of the catalyst may include a tertiary amine such as pyridine, collidine, and the like.

The photo reactive part may include a first group having a first carbon-carbon double bond and a second group having a second carbon-carbon double bond and being coupled to the first group i.e., through a common intermediate group. When the photo alignment polymer is exposed to light, an intramolecular reaction between the first and second groups may be effected. Furthermore, an intermolecular reaction between a first carbon-carbon double bond of a first group of a first diamine monomer and a first carbon-carbon double bond of a first group (or a second carbon-carbon double bond of a second group) of a second diamine monomer spatially adjacent to the first diamine monomer may be effected. Thus, the density of the resulting alignment layer may thereby increase. Accordingly, ends of branch groups are densely disposed on a surface of the alignment layer so that the space in which the ends of the branch groups may move is reduced. Thus, orientation of the alignment layer may be prevented from changing when an electric stress is applied to the alignment layer, as by applying a voltage.

A photo alignment polymer according to an example embodiment includes at least two photo reactive parts represented by the following Chemical Formula 24.

Chemical Formula 24

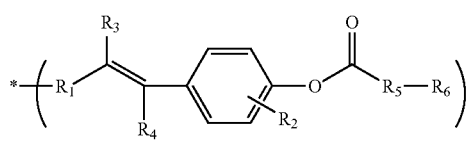

In Chemical Formula 24, $R_1$ represents —$(CH_2)_n$—, —$O(CH_2)_n$— or

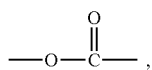

$R_2$, $R_3$ and $R_4$ each independently represent —H, —O$(CH_2)_{m-1}$—$CH_3$ or

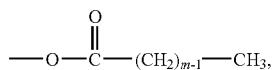

n and m each independently represent an integer of from 1 to 8, and $R_5$ represents a and b each independently represent an integer of from 1 to 8, $R_6$ represents —O$(CH_2)_e$—$CX_2$—$CY_3$, X and Y each independently represent a hydrogen atom or a fluorine atom, and e represents an integer of from 1 to 18.

$R_6$, which is an end of a branch group of the polymer represented by Chemical Formula 24, substantially affects the aligning of the liquid crystal molecule. The branch group may be orientated substantially vertically with respect to a surface of the alignment layer, which is substantially parallel to the plane of a substrate. For example, the end of the branch group may be hydrophobic.

Examples of the diamine monomer having at least two of the photo reactive parts represented by Chemical Formula 24 may include chemical compounds represented by the following Chemical Formulas 25 to 27. These can be used alone or in a combination.

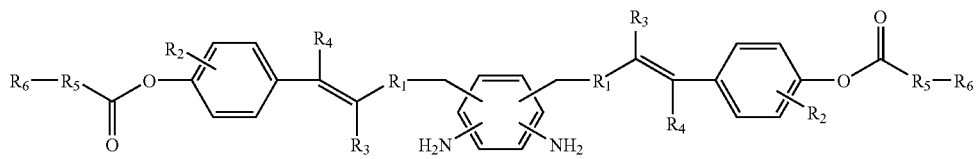

Chemical Formula 25

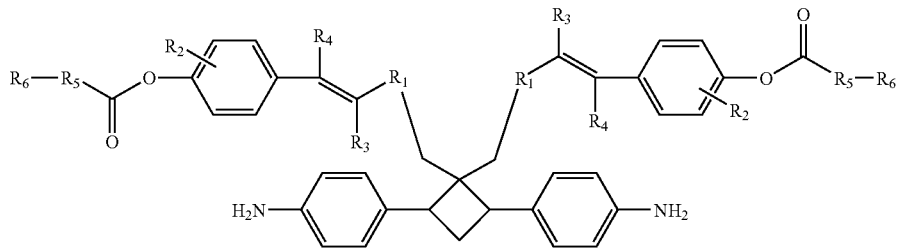

Chemical Formula 26

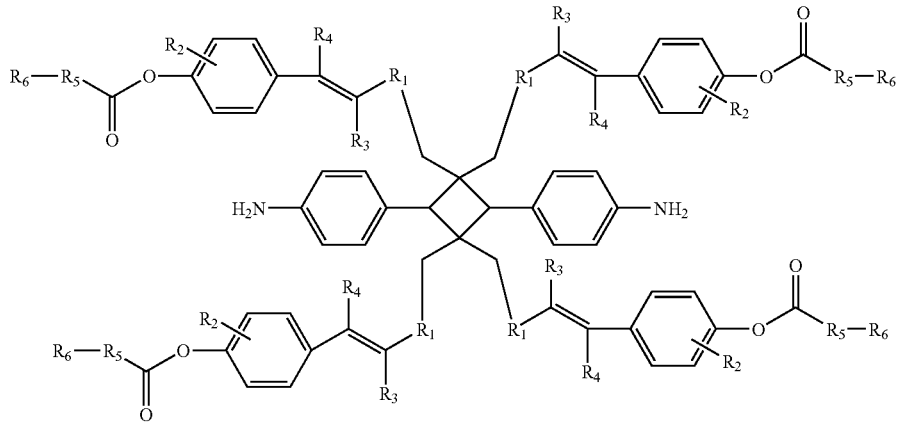

Chemical Formula 27

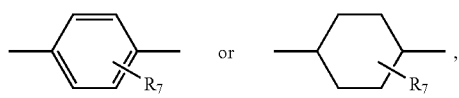

$R_7$ represents —H, —O$(CH_2)_{a-1}$—$CH_3$ or

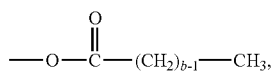

In Chemical Formulas 25 to 27, $R_1$ represents —$(CH_2)_n$—, —O$(CH_2)_n$— or

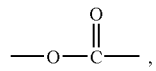

and $R_2$, $R_3$ and $R_4$ each independently represent —H, —O$(CH_2)_{m-1}$—$CH_3$ or

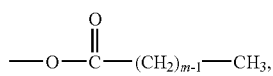

n and m independently represent an integer of from 1 to 8, $R_5$ represents

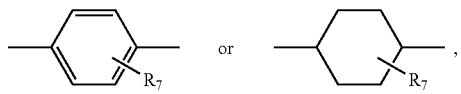

$R_7$ represents —H, —O(CH$_2$)$_{a-1}$—CH$_3$ or

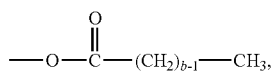

a and b each independently represent an integer of from 1 to 8, $R_6$ represents —O(CH$_2$)$_e$—CX$_2$—CY$_3$, X and Y independently represent a hydrogen atom or a fluorine atom, and e represents an integer of from 1 to 18.

In an embodiment, exemplary diamine monomers may include chemical compounds represented by the following Chemical Formulas 28 to 30.

In Chemical Formula 28, the diamine monomer includes two photo reactive parts represented more generally by Chemical Formula 24. Alternatively, the photo reactive part may be respectively coupled to four carbon atoms of the benzene ring excluding carbon atoms coupled to two amino groups. Thus, the diamine monomer includes four photo reactive parts represented generally by Chemical Formula 24.

In Chemical Formulas 29 and 30, the diamine monomer includes two or four photo reactive parts represented generally by Chemical Formula 24. Alternatively, an additional (e.g., third, fourth, etc.) photo reactive part may be coupled to a common carbon atom coupled to the photo reactive parts in place of a hydrogen atom so that the diamine monomer may include three or six photo reactive parts.

The weight-average molecular weight (Mw) of the photo alignment polymer, which is measured by gel permeation chromatography (GPC) using a universal calibration curve calibrated to monodisperse polystyrene samples, may be about 10,000 to about 100,000 g/mol. When the weight average molecular weight of the photo alignment polymer is less than about 10,000 g/mol, forming a film therefrom may be difficult. When the weight average molecular weight of the photo alignment polymer is more than about 100,000 g/mol, solubility in the solvent may be reduced, and thus, printing the photo alignment material on a substrate may be difficult. For at least these reasons, the molecular weight of the photo alignment is desirably about 10,000 to about 100,000 g/mol.

Chemical Formula 28

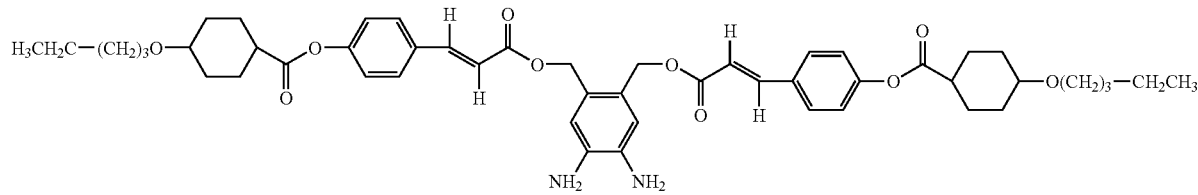

Chemical Formula 29

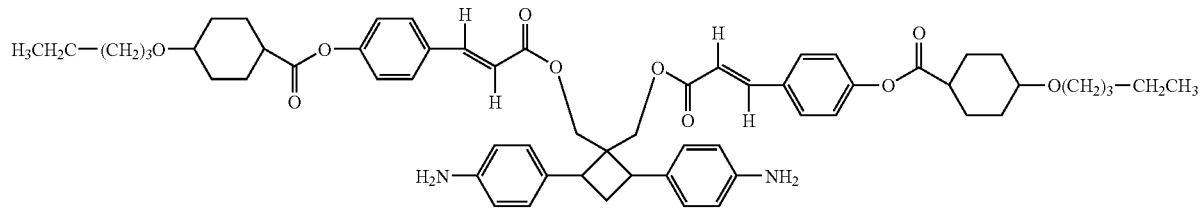

Chemical Formula 30

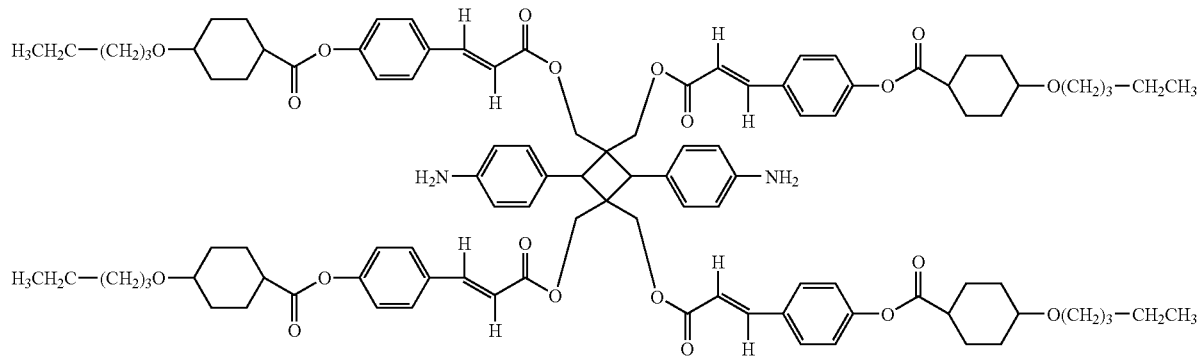

The diamine monomer may include a first photo reactive part having a first carbon-carbon double bond and a second photo reactive part having a second carbon-carbon double bond and being coupled through a common group to the first photo reactive part. When the photo alignment polymer is exposed to light, the first carbon-carbon double bond and the second carbon-carbon double bond may react with each other by intramolecular reaction between the first and second photo reactive parts. Alternatively, or in addition, an intermolecular reaction between a first carbon-carbon double bond of a first photo reactive part of a first diamine monomer and a first carbon-carbon double bond of a first photo reactive part (or a second carbon-carbon double bond of a second photo reactive part) of a second diamine monomer that is spatially adjacent to the first diamine monomer may be effected. In this way the density of an alignment layer may be increased. Accordingly, the ends of the photo reactive parts are densely disposed on a surface of the alignment layer so that any space in which the ends of the photo reactive parts may move is thereby reduced. In this way, orientation of the alignment layer may be prevented from changing when an electric stress is applied to the alignment layer by a voltage.

Examples of the organic solvent may include, in an embodiment, chlorobenzene, N-methylpyrrolidone, dimethylsulfoxide, toluene, chloroform, gamma-butyrolactone, methylcellosolve, butylcellosolve, butylcarbitol, tetrahydrofuran, and the like. These can be used alone or in a combination.

The organic solvent dissolves the polymer solids including the photo alignment polymer, and the solids content of the photo alignment polymer depend on the type and amount of the organic solvent. When the solids content of the photo alignment material is less than about 3% by weight, forming an alignment layer may be difficult. When the content of the photo alignment material is greater than about 10% by weight, coating the photo alignment material uniformly may be difficult. Thus, the solid content of the photo alignment material may be preferably about 3% to about 10% by weight. It will be noted that the polymer solids weight percentages are based on the total weight of photo alignment polymer and solvent. In an exemplary embodiment, about 5 g of the solid and about 95 g of the organic solvent may be mixed with each other to prepare a photo alignment material. One skilled in the art will recognize that the exemplary solids is illustrative only and should not be construed as limited thereto, as it is known to vary the solids content of coating solutions to achieve a desired thickness during coating.

When the photo alignment polymer is exposed to light, photo reactive parts adjacent to each other form a polymerized part represented by the following Chemical Formula 31. The polymerized part is formed so that a surface of the alignment layer has an orientation.

Chemical Formula 31

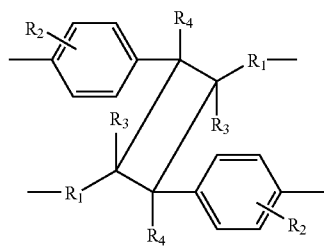

In Chemical Formula 31, $R_1$ represents $-(CH_2)_n-$, $-O(CH_2)_n-$ or

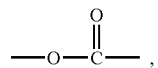

$R_2$, $R_3$ and $R_4$ each independently represent $-H$, $-O(CH_2)_{m-1}-CH_3$ or

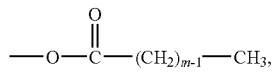

and n and m each independently represent an integer of from 1 to 8.

In an embodiment, the diamine monomer including at least two photo reactive parts may include diaminobenzene as described hereinabove. Alternatively, examples of the diamine monomer may include diamine compounds represented by the following Chemical Formulas 32 to 39, coupled to photo reactive parts.

Chemical Formula 32

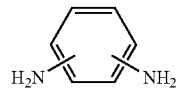

Chemical Formula 33

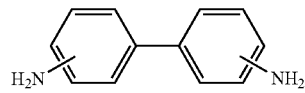

Chemical Formula 34

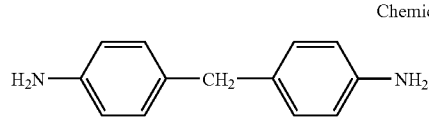

Chemical Formula 35

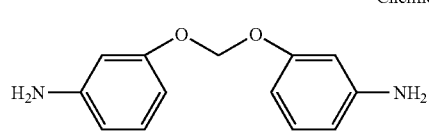

Chemical Formula 36

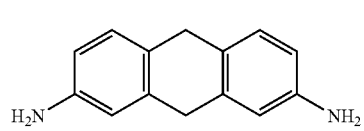

Chemical Formula 37

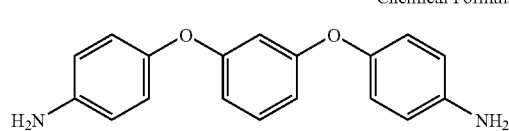

Chemical Formula 38

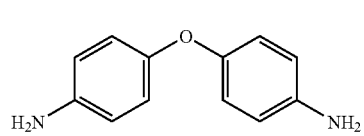

-continued

Chemical Formula 39

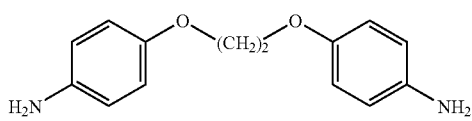

Synthetic Example of Diamine Monomer

About 10 mmol (about 1.82 g) of (1-hydroxymethyl)-2-hydroxyethyl-1,4-diaminobenzene, about 0.1 mmol of triphenylphosphine and about 100 ml of acetone were mixed. About 10 mmol (about 8.8 g) of 3-[4-{4-(4-1,1,1,2,2-pentafluoropentyloxyphenyl)carbonyloxy}phenyl]prop-2-enoic acid was added dropwise into the mixture being stirred so that about 8.52 g of 2,2-bis(1,4-diaminophenyl)-1,3-di[3-[4-{4-(4-(1,1,1,2,2-pentafluoro)pentyloxyphenyl)carbonyloxy}phenyl]prop-2-enoyl]propanediol was prepared.

Synthetic Example of Photo Alignment Polymer

About 10 mmol (about 10.34 g) of 2,2-bis(1,4-diaminophenyl)-1,3-di[3-[4-{4-(4-(1,1,1,2,2-pentafluoro)pentyloxyphenylcarbonyloxy}phenyl]prop-2-enoyl]propanediol was dissolved in about 1000 ml of a solvent including about 70 parts by weight of N-methylpyrrolidone and about 30 parts by weight of butylcarbitol in an atmosphere of argon (Ar) gas. The temperature of the solution was maintained at about 0° C. After about 10 mmol of the acid anhydride represented by Chemical Formula 13 was added to the solution, the temperature was increased from about 0° C. to about 25° C. while the solution was slowly stirred. The reaction was stopped when the viscosity of the solution was about 0.20 dl/g to about 0.30 dl/g to prepare a photo alignment polymer.

Example 1

About 5 g of the above-prepared photo alignment polymer was dissolved in about 95 g of a solvent including about 70 parts by weight of N-methylpyrrolidone and about 30 parts by weight of butylcarbitol.

Method of Manufacturing a Display Substrate

Hereinafter, an exemplary method of manufacturing a display substrate using a polymer alignment material according to an embodiment will be described with reference to FIGS. 1 to 4.

Figure 2:
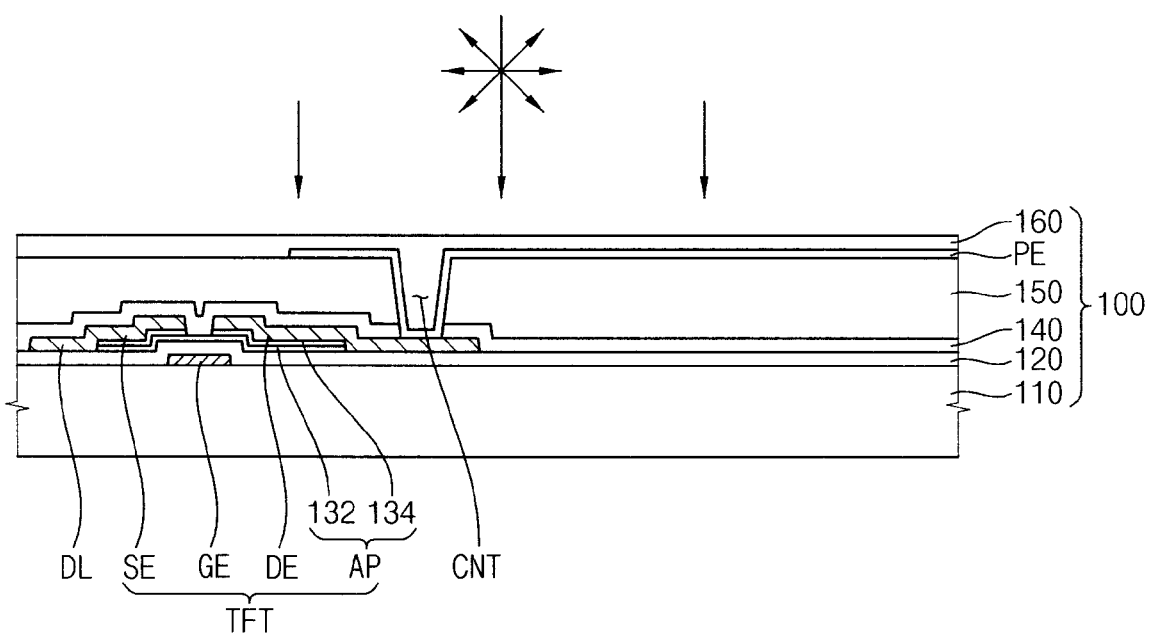

FIGS. 1 and 2 are cross-sectional views illustrating an exemplary display substrate prepared according to an exemplary method of manufacture.

Referring to FIG. 1, a pixel unit is formed on a surface of a first base substrate 110 including, for example, glass or sodalime. The pixel unit formed on the first base substrate 110 includes a gate line (not shown), a data line DL disposed on a surface of a gate insulation layer 120 which is in turn disposed on a surface of the first base substrate 110, a switching device TFT (comprising a source electrode SE, a gate electrode GE, a drain electrode DE, and an active pattern AP comprising ohmic contact layer 132 and semiconductor layer 134, the disposition of each of which will be further explained hereinbelow) connected to the gate and data lines, a passivation layer 140 disposed on a surface of the gate insulation layer 120 opposite first base substrate 110, an organic layer 150 disposed on a surface of passivation layer 140 opposite gate insulation layer 120, and a pixel electrode PE disposed on a surface of the organic layer 150 opposite passivation layer 140.

The TFT structure is formed in part by, for example, forming a gate metal layer on a surface of the first base substrate 110, patterning the gate metal layer by a photolithography process then etching to form the gate line and a gate electrode GE electrically connected to the gate line.

The gate insulation layer 120 and an active pattern AP are formed sequentially on the surface of the first base substrate 110 having disposed thereon the gate line and the gate electrode GE so that the gate insulation layer covers the exposed portions of the first base substrate and gate line and gate electrode GE. The active pattern AP is formed on a surface of the gate insulation layer 120 and may include a semiconductor layer 132 formed on a surface of the gate insulation layer 120 from, for example, amorphous silicon, and an ohmic contact layer 134 formed on a surface of the semiconductor layer 132 opposite the gate insulation layer 120 from amorphous silicon into which n-type impurities are implanted at a high concentration.

A data metal layer is then formed on a surface of gate insulation layer 120 opposite the first base substrate 110 having the active pattern AP such that the data metal layer covers the active pattern AP, and then the data metal layer is patterned by a photolithography process and etched to form data line DL, a source electrode, SE electrically connected to the data line DL, and a drain electrode DE spaced apart from the source electrode SE and thereby not connected directly to the data line DL and source electrode SE. The gate electrode GE, the active pattern AP, the source electrode SE and the drain electrode DE define in this exemplary arrangement the switching device TFT. However, the foregoing description should not be considered as limited thereto.

The passivation layer 140 is formed on and overcoats the surfaces of the gate insulation layer 120, data line DL, source electrode SE and drain electrode DE, opposite first base substrate 110. The organic layer 150 is formed on a surface of the passivation layer 140 opposite gate insulation layer 120, data layer DL, source electrode SE, and drain electrode DE. A portion of each of the passivation layer 140 and the organic layer 150, overlying the drain electrode DE, is removed to form a contact hole CNT, thereby exposing a portion of the drain electrode DE.

The pixel electrode PE is then formed on a surface of the organic layer 150 opposite passivation layer 140 and, through which the contact hole CNT is formed, by depositing a pixel electrode metal layer on a surface of organic layer 150 opposite the passivation layer 140 such that the pixel electrode metal layer covers the organic layer 150 and is deposited into the contact hole CNT, and then the pixel electrode metal layer is patterned by a photolithography process and etched to form the pixel electrode PE. The pixel electrode PE is thus electrically connected to the switching device TFT through the contact hole CNT.

Referring to FIG. 2, a photo alignment material is coated on organic layer 150 and the pixel electrode PE opposite the first base substrate 110 having the pixel unit, to form a first a photo alignment material layer 160 as part of first alignment substrate 100.

The photo alignment material includes a photo alignment polymer and an organic solvent. The photo alignment polymer is prepared by polymerizing a diamine monomer including at least two photo reactive parts represented by Chemical Formula 1. The photo alignment material thus comprises the same materials as the photo alignment material disclosed hereinabove, and therefore, any further explanation of the photo alignment polymer is redundant and need not be reiterated.

The first photo alignment material layer 160 is pre-baked at about 50° C. to about 70° C., for a time of about 10 seconds to about 3 minutes, and then hard-baked at about 180° C. to 220° C., for a time of about 5 to about 60 minutes. Thereafter, the first photo alignment material layer 160 is irradiated using a polarized light of an appropriate wavelength (where the appropriate wavelength induces photolytic dimerization). Accordingly, an end of a branch group of the photo alignment polymer in the first photo alignment material layer 160 is oriented so that the end of the branch group of the photo alignment polymer is tilted by a predetermined angle with respect to the surface of the first base substrate 110. Thus, a first alignment layer 162 illustrated in FIG. 5 having an orientation is formed.

The polarized light may be ultra-violet (UV) light, and the intensity of the UV light may be about 0.5 J/cm$^2$ to about 2 J/cm$^2$. Sources of UV light wavelengths for irradiation include those emitting at 436 nm, 365 nm, 254 nm, 248 nm, 193 nm, or broadband emission including those encompassing one or more of these wavelengths. The surface of the first alignment layer 162 may be oriented by about 87° to about 90° with respect to the surface of the first base substrate 110. The photo alignment polymer may have a polymerized part represented by Chemical Formula 31 so as to have an orientation. The surface density of the first alignment layer 162 can increase due to intermolecular reaction and/or intramolecular reaction of the photo reactive parts of the photo alignment polymer. Thus, the orientation of the first alignment layer 162 can be prevented from changing by the action of an electric stress.

Figure 3:
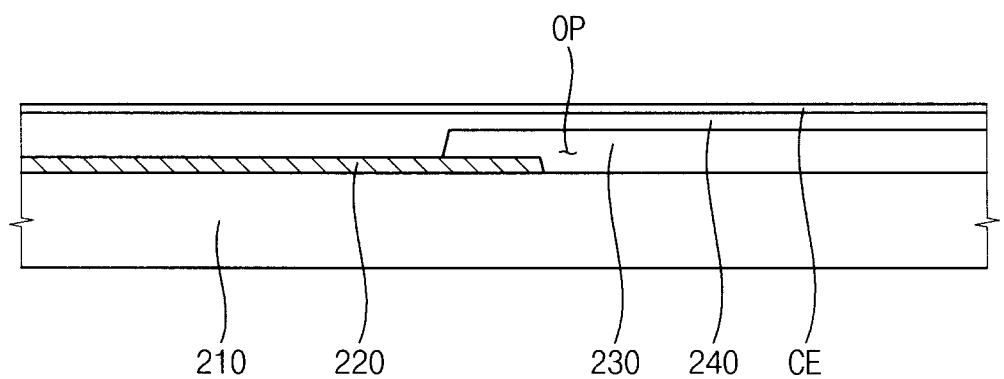
FIGS. 3 and 4 are cross-sectional views illustrating an exemplary method of manufacturing a display substrate according to an embodiment.
Figure 4:
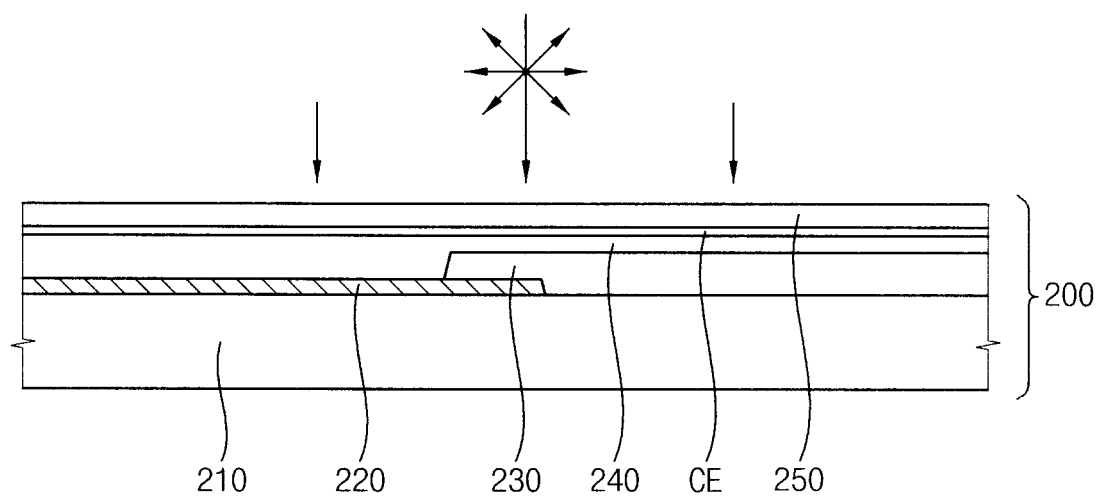

FIGS. 3 and 4 are cross-sectional views illustrating a method of manufacturing a display substrate according to an embodiment.

Referring to FIG. 3, a pixel unit is formed on a surface of a second base substrate 210 including, for example, glass or sodalime. The pixel unit formed on a surface of the second base substrate 210 includes a black matrix pattern 220, a color filter 230 partially overlapping the black matrix, an overcoating layer 240 disposed on a surface of the black matrix pattern 220 and the color filter 230, and a common electrode CE disposed on a surface of the overcoating layer 240 opposite the black matrix pattern 220 and the color filter 230.

Further, a light-blocking layer (not shown) may be formed on the second base substrate 210, and then patterned by a photolithography process to form the black matrix pattern 220. The black matrix pattern 220 includes an opening portion OP to uncover a portion of the second base substrate 210.

The color filter 230 is formed in the opening portion OP of the second base substrate 210 having the black matrix pattern 220. For example, a color photoresist layer may be formed on a surface of the second base substrate 210 having the black matrix pattern 220, and then patterned by a photolithography process to form the color filter 230. Alternatively, color ink may be sprayed, dropped or otherwise deposited into the opening portion OP to form the color filter 230.

The overcoating layer 240 and the common electrode CE are formed on a surface of the overcoating layer 240 opposite the second base substrate 210 having the color filter 230.

Figure 5:
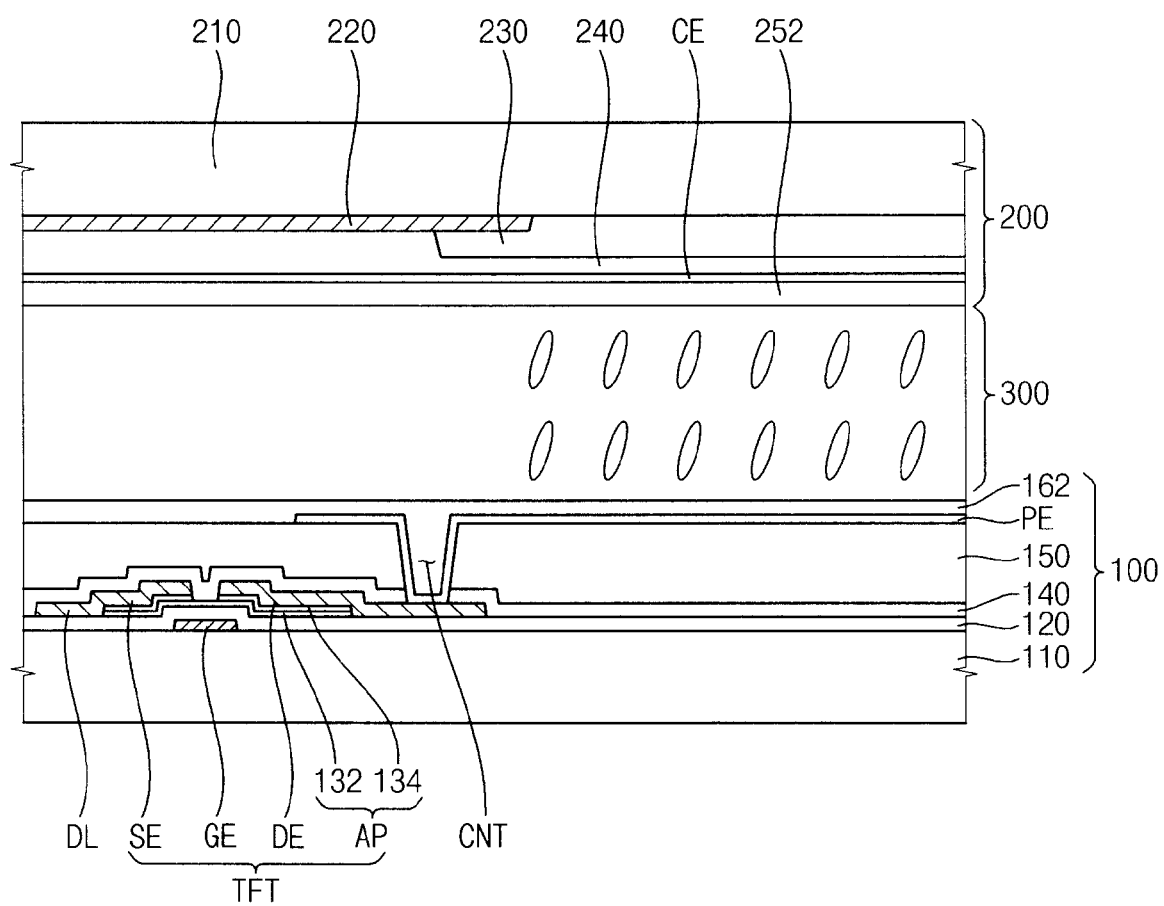
FIG. 5 is a cross-sectional view illustrating an exemplary LCD panel including the display substrates illustrated in FIGS. 2 and 4.

Referring now to FIG. 4, a second photo alignment material layer 250 is formed on the second base substrate 210 having the common electrode CE. The second photo alignment material layer 250 is then irradiated with light (e.g., UV light) to form a second alignment layer 252, to thereby form second alignment substrate 200 as illustrated in FIG. 5. Processes for forming the second alignment layer 252 may be the same as the processes disclosed hereinabove for forming the first alignment layer 160. Any further explanation of the second alignment layer 252 is therefore redundant and will be omitted.

FIG. 5 is a cross-sectional view illustrating a LCD panel including the display substrates illustrated in FIGS. 2 and 4.

Referring to FIG. 5, first alignment substrate 100 comprising the first base substrate 110 having the first alignment layer 162 is arranged to face second alignment substrate 200 comprising the second base substrate 210 having the second alignment layer 252. Liquid crystal molecules are interposed in the resulting space between the first and second alignment layers 162 and 252 to form a liquid crystal layer 300.

Predetermined voltages applied to the pixel electrode PE and the common electrode CE generate an electric field between the pixel electrode PE and the common electrode CE. Orientation of the liquid crystal molecules may be changed by varying the electric field. According to an embodiment, the surface density of the first and second alignment layers increases, and thus, the orientation of the first and second alignment layers may be prevented from changing by the action of an electric stress.

Comparative Example 1

Synthetic Example of Photo Alignment Polymer

About 10 mmol of [3-[4-{4-(4-(1,1,1,2,2-pentafluoro)pentyloxyphenyl)carbonyloxy}phenyl]prop-2-enoyl]ethyl diaminobenzene was dissolved in about 1000 ml of a solvent including about 70 parts by weight of N-methylpyrrolidone and about 30 parts by weight of butylcarbitol under an atmosphere of argon (Ar) gas. The temperature of the solution was maintained at about 0° C. After about 10 mmol of the acid dianhydride represented by Chemical Formula 13 was added to the solution, the temperature was increased from about 0° C. to about 25° C. while the solution was slowly stirred, to prepare a photo alignment polymer.

Photo Alignment Material

About 5 g of the above-prepared photo alignment polymer was dissolved in about 95 g_of a solvent including about 70 parts by weight of N-methylpyrrolidone and about 30 parts by weight of butylcarbitol.

Evaluation of Alignment Layers

The photo alignment materials of Example 1 and Comparative Example 1 were respectively coated on a glass substrate having a square shape and having a diagonal line of about 17 inch (43 cm), and pre-baked at about 60° C. for about 75 seconds, and cured at about 200° C. for about 10 minutes. The substrate was exposed to UV light at a wavelength of about 250 nm to about 350 nm (mixed light) having an intensity of about 1 J/cm$^2$ in an anti-parallel direction by using a UV light exposure device (manufactured by USHIO, Japan), the UV light linearly polarized in a direction of about 40° assuming a vertical direction with respect to the surface of the substrate of about 0°. Thereafter, a liquid crystal (manufacture by Merck, Germany) for vertical alignment ("VA") was injected into to the substrate to effect manufacture an LCD panel.

In the case of the LCD panel including the alignment layer using the photo alignment material of Example 1, the liquid crystal had a linear inclination of about 89.0° by the photo alignment layer, and the LCD panel displayed a relatively clean image without blur. The LCD panel was maintained in a state of charge sufficient to display a check flag pattern for about 24 hours at about 50° C. Thereafter, residual characteristics of the LCD panel were evaluated, and a linear after-image and an aerial after-image did not appear. The response speed was about 8.0 ms, and the contrast was about 2250 (relative units).

In the case of the LCD panel including the alignment layer using the photo alignment material of Comparative Example 1, the liquid crystal had a linear inclination of about 89.0° by the photo alignment layer, and the LCD panel displayed a relatively clean image without blur. The LCD panel was maintained in a state of charge sufficient to display a check flag pattern for about 24 hours at about 50° C. Thereafter, residual characteristics of the LCD panel were evaluated, and an aerial after-image appeared even at an applied voltage of about 5.0V.

Figure 6A:
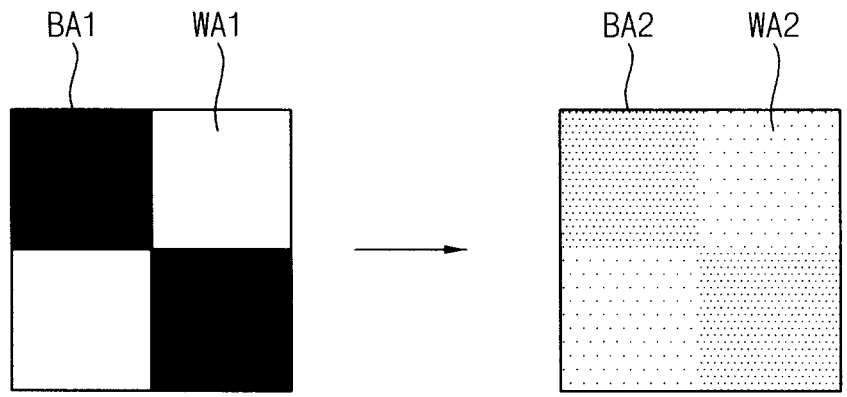
FIGS. 6A and 6B are plan views illustrating results obtained from after-image tests of exemplary display panels.
Figure 6B:
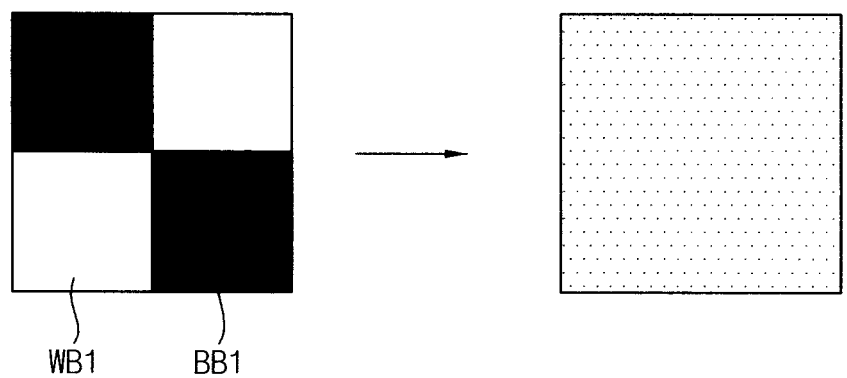
Figure 7A:
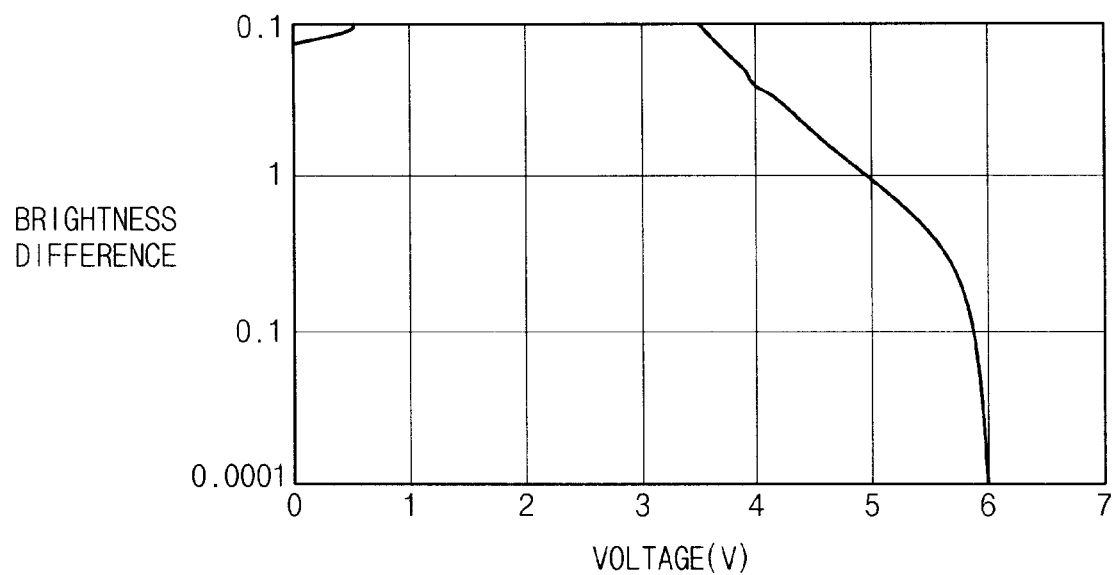
FIGS. 7A and 7B are graphs illustrating a brightness difference between an exemplary black area and an exemplary white area.
Figure 7B:
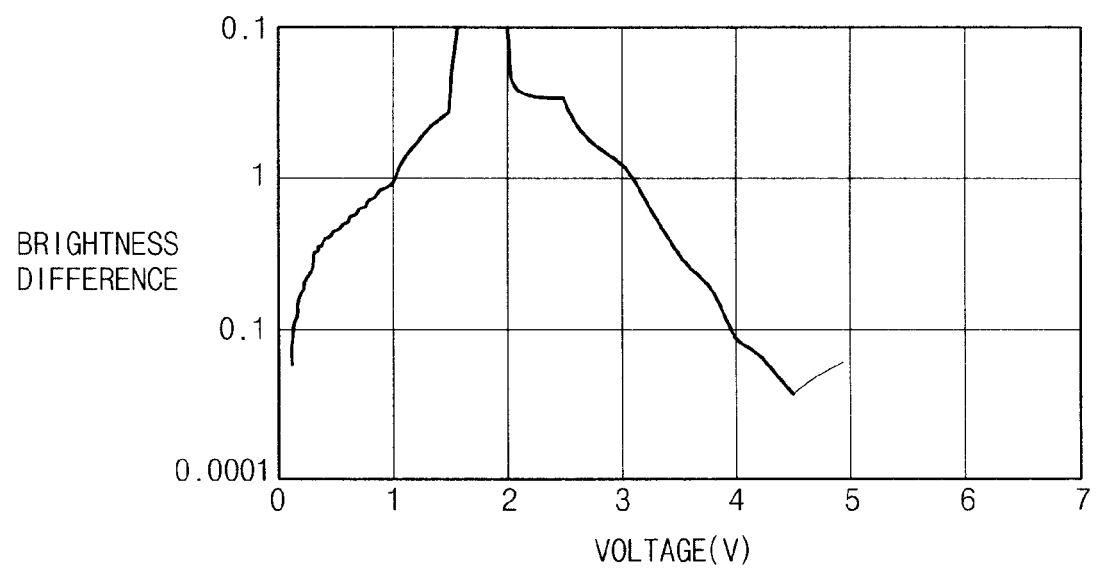
Figure 8A:
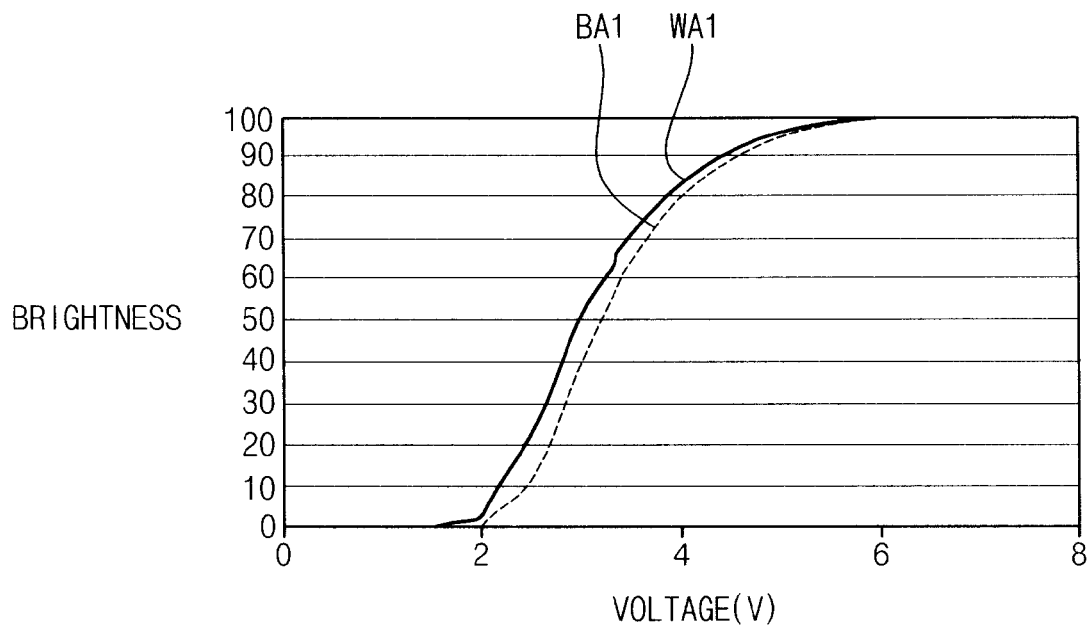
FIGS. 8A and 8B are each graphs illustrating brightness in an exemplary black area and an exemplary white area.

Results obtained from applying a voltage of the LCD panels are illustrated in FIGS. 6A and 6B, and brightness variances based on voltage variances are illustrated in FIGS. 7A, 7B, 8A and 8B. Specifically, results obtained from the LCD panel including the alignment layer using the photo alignment material of Comparative Example 1 are illustrated in FIGS. 6A, 7A and 8A, and results obtained from the LCD panel including the alignment layer using the photo alignment material of Example 1 are illustrated in FIGS. 6A, 7A and 8A.

FIGS. 6A and 6B are plan views illustrating results obtained from after-image tests of display panels.

Referring to FIG. 6A, a display area of the LCD panel including the alignment layer using the photo alignment material of Comparative Example 1 was divided (a) into a first black area BA1 and a first white area WA1. A first voltage was applied to the first black area BA1 to display a black image, and a second voltage different from the first voltage was applied to the first white area A1 to display a white image. The alignment layers had a linear inclination of about 89.3°.

About 1V as the first voltage was applied to the first black area BA1 in normally black mode, and about 7V as the second voltage was applied to the first white area WA1. Thus, a black image was displayed in the first black area BA1, and a white image was displayed in the first white area WA1. The black and white images were maintained for about 24 hours.

Thereafter, in (b) a third voltage was applied to the first black area BA1 and the first white area WA1. The third voltage had a value between the first and second voltages, and a display area, to which the third voltage was applied, displayed a gray image. Particularly, the third voltage was about 2V. When the third voltage was applied to the first black area BA1 and the first white area WA1, a brightness of the first black area BA2 was different from a brightness of the first white area WA2 thereby causing an aerial after-image.

After about 24 hours, a linear inclination of the alignment layer was measured. The linear inclination of the alignment layer in the first black area BA1 was about 89.33° and in BA2 was about 89.39°, which were similar to the initial linear inclination (about 89.3°). However, the linear inclination of the alignment layer in the first white area WA1 was about 88.53° and in WA2 was about 88.42°, which were less than the initial linear inclination.

Referring to FIG. 6B, in (a), a first voltage was applied to a second black area BB1 to display a black image, and a second voltage different from the first voltage was applied to a second white area WB1 to display a white image. The first voltage (applied to BB1) was about 1V, and the second voltage (applied to WB1) was about 7V. The black and white images were maintained for about 24 hours.

After about 24 hours in (b), a linear inclination of the alignment layer was measured. The linear inclination of the alignment layer in the second black area BB1 was about 89.33° and in the corresponding region after 24 hours at 1V, about 89.39°, which were similar to the initial linear inclination (i.e., about 89.3°). Furthermore, the linear inclination of the alignment layer in the second white area WB1 was about 89.35° and in the corresponding region after 24 hours at 7V, about 89.4°, which were similar to the initial linear inclination.

FIGS. 7A and 7B are graphs illustrating a brightness difference between a black area (e.g., BA1 in FIG. 6A-a) and a white area (e.g., WA1 in FIG. 6A-a). In FIGS. 7A and 7B, x-coordinates represent a voltage, and y-coordinates represent a value obtained from dividing a brightness difference between the black area and the white area by a brightness of the black area at about 2V.

Referring to FIG. 7A, a voltage is about 4.98V when a brightness difference between the first black area BA1 and the first white area WA1 is less than about 1%. Thus, it can be noted that the voltage below which an aerial after-image does not occur is about 4.98V Referring to FIG. 7B, the voltage is about 3.1V when the brightness difference between the second black area BB1 (e.g., BB1 in FIG. 6B-a) and the second white area WB1 (e.g., WB1 in FIG. 6B-a) is less than about 1%. Thus, it can be noted that an areal after-image is not observed at relatively a low voltage on the LCD panel including the alignment layer using the photo alignment material of Example 1 when compared to the LCD panel including the alignment layer using the photo alignment material of Comparative Example 1.

Therefore, it can be noted that the LCD panel including the alignment layer using the photo alignment material of Example 1 is cable of improving both the aerial after-image and display quality when compared to the LCD panel including the alignment layer using the photo alignment material of Comparative Example 1.

Figure 8B:
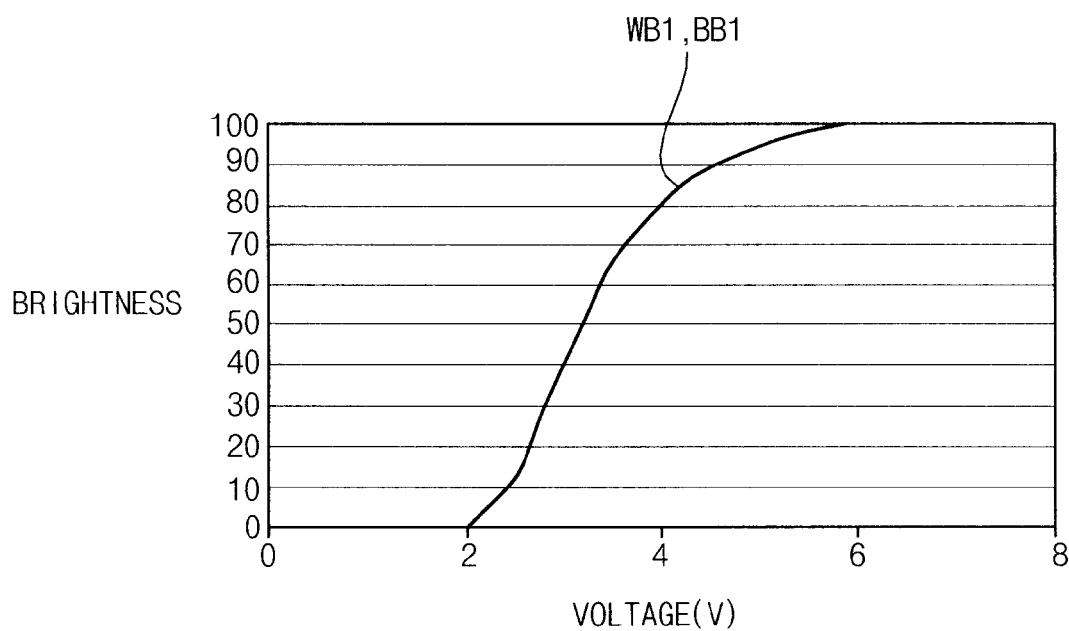

FIGS. 8A and 8B are graphs illustrating brightness in a black area and a white area. In FIGS. 8A and 8B, x-coordinates represent voltage (V), and y-coordinates represent brightness (%).

About 1V was applied to the first and second black areas BA1 and BB1 of the LCD panels respectively including the alignment layers using the photo alignment materials of Example 1 and Comparative Example 1, and about 7V was applied to the first and second white areas WA1 and WB1 of the LCD panels for aging. Thereafter, a voltage from about 2V to about 6V was applied to the first and second black areas BA1 and BB1 and the first and second white areas WA1 and WB1 of the LCD panels. The brightness was about 0% when the voltage was about 2V, and the brightness was about 100% when the voltage was about 6V.

Referring to FIG. 8A, a graph of the first black area BA1 does not coincide with a graph of the first white area WA1. Thus, it can be noted that the brightness of the first black area BA1 was different from the brightness of the first white area WA1 since orientation of the alignment layer in the first white area WA1 was changed by the voltage applied to the first white area WA1. A value obtained from dividing the brightness difference between the first white area WA1 and the first black area BA1 by the brightness of the first black area BA1 at about 0V was about 7.36.

Referring to FIG. 8b, a graph of the second black area BB1 coincides with a graph of the second white area WB1. Thus, it can be noted that the brightness of the second black area BB1 was similar to the brightness of the second white area WB1 since the orientation of the alignment layer in the second white area WB1 was not changed when the voltage was applied to the second white area WB1. A value obtained from dividing the brightness difference between the second white area WB1 and the second black area BB1 by the brightness of the second black area BB1 at about 0V was about 0.6. Thus, it can be seen that the LCD panel including the alignment layer using the photo alignment material of Example 1 is cable of improving the aerial after-image (i.e., by reducing the susceptibility of the LCD panel to formation of an after-image) compared to the LCD panel which includes the alignment layer using the photo alignment material of Comparative Example 1.

Thus, according to embodiments of the present invention, a photo alignment polymer is formed from a diamine monomer including at least two photo reactive parts. The photo alignment polymer is exposed to light thereby causing an intramolecular reaction between photo reactive parts of a photo alignment polymer and an intermolecular reaction between photo reactive parts of adjacent photo alignment polymers so that a surface of an alignment layer has an orientation. Thus, the density of the surface of the alignment layer increases so that change of the orientation of the alignment layer due to the action of an electric stress may be prevented and/or reduced. Therefore, an after-image may be reduced, and a display quality may be improved.

The foregoing is illustrative of the present invention and is not to be construed as limiting thereof. Although embodiments have been described, those skilled in the art will readily appreciate that many modifications are possible in the embodiments without materially departing from the novel teachings and advantages of the present invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A photo alignment material comprising:
a photo alignment polymer prepared by polymerizing a diamine monomer including at least two photo reactive parts, wherein the at least two photo reactive parts comprises a chemical compound represented by the following Chemical Formula 1, wherein
R$_1$ represents —(CH$_2$)$_n$— or —O(CH$_2$)$_n$—, and R$_2$, R$_3$ and R$_4$ each independently represent —H, —O(CH$_2$)$_{m-1}$—CH$_3$ or

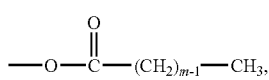

and n and m each independently represent an integer of from 1 to 8; and
an organic solvent Chemical Formula 1

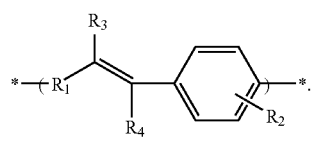

2. The photo alignment material of claim 1, wherein the photo reactive part is represented by the following Chemical Formula 2, wherein R$_1$ represents —(CH$_2$)$_n$— or —O(CH$_2$)$_n$—,
R$_2$, R$_3$ and R$_4$ each independently represent —H, —O(CH$_2$)$_{m-1}$—CH$_3$ or

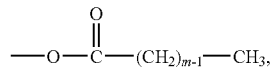

n and m each independently represent an integer of from 1 to 8, R$_5$ represents

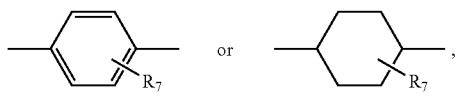

R$_7$ represents —H, —O(CH$_2$)$_{a-1}$—CH$_3$ or

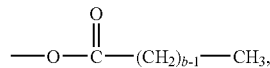

a and b each independently represent an integer of from 1 to 8, R$_6$ represents —O(CH$_2$)$_e$—CX$_2$—CY$_3$, X and Y each independently represent a hydrogen atom or a fluorine atom, and e represents an integer of from 1 to 18

Chemical Formula 2

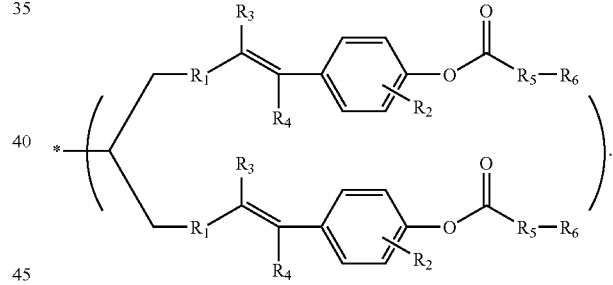

3. The photo alignment material of claim 1, wherein the diamine monomer comprises at least one selected from the group consisting of chemical compounds represented by the following Chemical Formulas 3 and 4, wherein R$_1$ represents —(CH$_2$)$_{n}$— or —O(CH2)$_n$—, R$_2$, R$_3$ and R$_4$ each independently represent —H, —O(CH$_2$)$_{m-1}$—CH$_3$ or

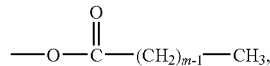

n and m each independently represent an integer of from 1 to 8, R$_5$ represents

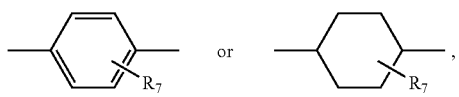

$R_7$ represents —H, —O(CH$_2$)$_{a-1}$CH$_3$ or

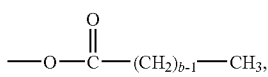

a and b each independently represent an integer of from 1 to 8, $R_6$ represents —O(CH$_2$)$_e$—CX$_2$—CY$_3$, X and Y each independently represent a hydrogen atom or a fluorine atom, and e represents an integer of from 1 to 18

Chemical Formula 3

Chemical Formula 4

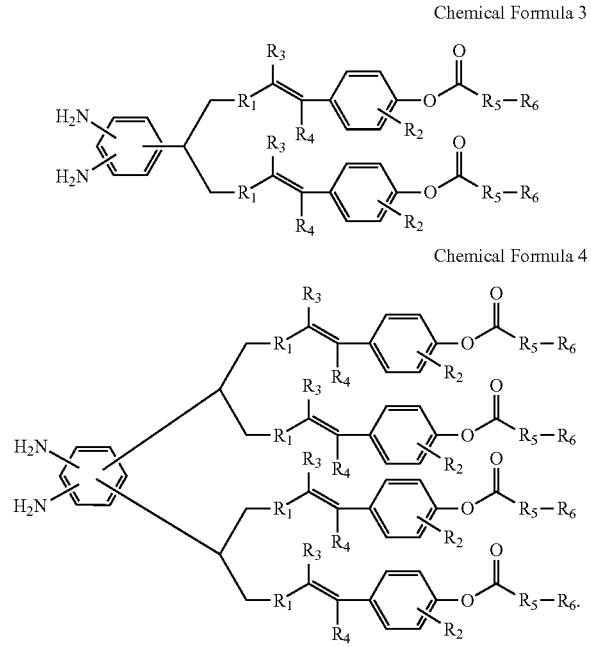

4. The photo alignment material of claim 1, wherein the photo reactive part is represented by the following Chemical Formula 7, wherein $R_1$ represents —(CH$_2$)$_{n-or}$—$_{O(CH2)n}$—, $R_2$, $R_3$ and $R_4$ each independently represent —H, —O(CH$_2$)$_{m-1}$—CH$_3$ or

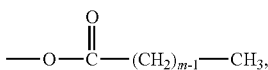

n and m each independently represent an integer of from 1 to 8, $R_5$ represents

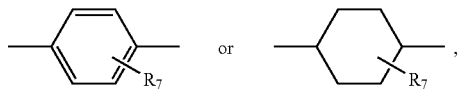

$R_7$ represents —H, —O(CH$_2$)$_{a-1}$—CH$_3$ or

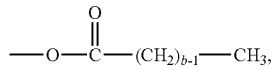

a and b independently represent an integer of from 1 to 8, $R_6$ represents —O(CH$_2$)$_e$—CX$_2$—CY$_3$, X and Y each independently represent a hydrogen atom or a fluorine atom, and e represents an integer of from 1 to 18

Chemical Formula 7

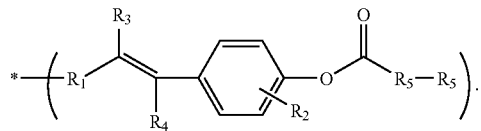

5. A photo alignment material comprising:

a photo alignment polymer prepared by polymerizing a diamine monomer including at least two photo reactive parts, the diamine monomer comprising at least one selected from the group consisting of chemical compounds represented by the following Chemical Formulas 8, 9 and 10, wherein $R_1$ represents —(CH$_2$)$_n$—, —O(CH$_2$)$_{n-or}$

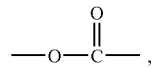

$R_2$, $R_3$ and $R_4$ each independently represent —H, —O(CH$_2$)$_{m-1}$—CH$_3$ or

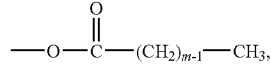

n and m each independently represent an integer of from 1 to 8, $R_5$ represents

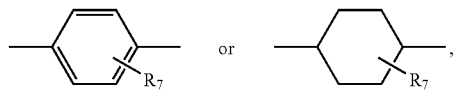

$R_7$ represents —H, —O(CH$_2$)$_{a-1}$—CH$_3$ or

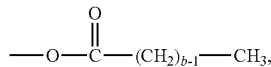

a and b each independently represent an integer of from 1 to 8, $R_6$ represents —O(CH$_2$)$_e$—CX$_2$—CY$_3$, X and Y each independently represent a hydrogen atom or a fluorine atom, and e represents an integer of from 1 to 18

Chemical Formula 8

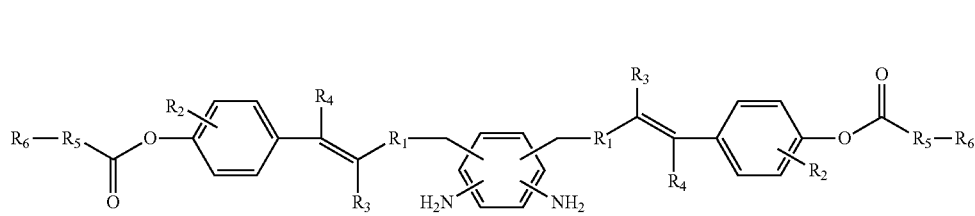

-continued

Chemical Formula 9

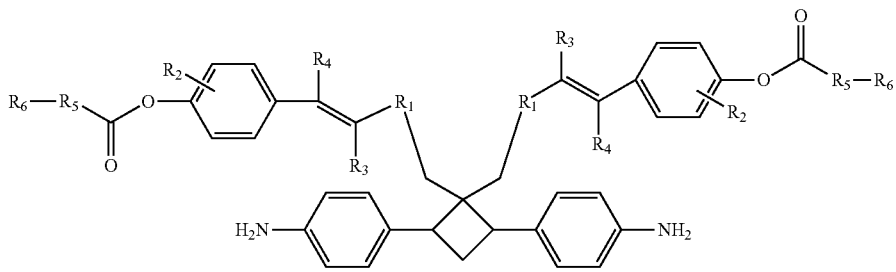

Chemical Formula 10

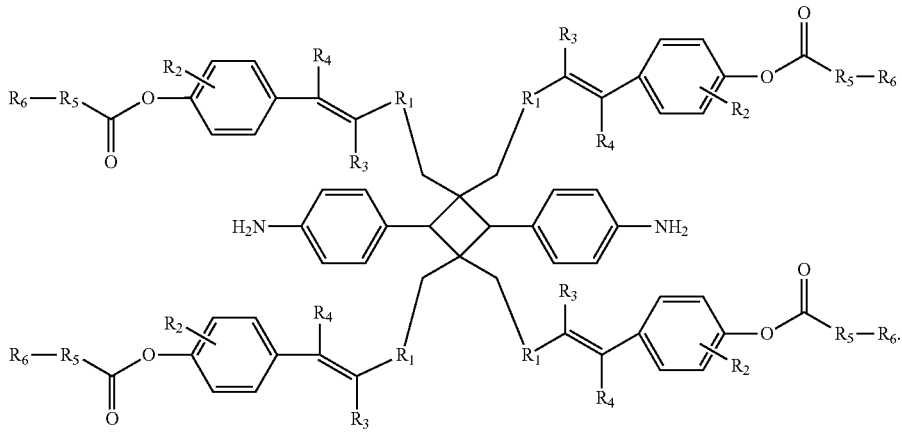

6. The photo alignment material of claim 1, wherein the organic solvent comprises at least one selected from the group consisting of chlorobenzene, N-methylpyrrolidone, dimethylsulfoxide, toluene, chloroform, gamma-butyrolactone, methylcellosolve, butylcellosolve, butylcarbitol and tetrahydrofuran.

7. A photo alignment material comprising:
a photo alignment polymer prepared by polymerizing a diamine monomer including at least two photo reactive parts, the diamine monomer comprising at least one selected from the group consisting of chemical compounds represented by the following Chemical Formulas 5 and 6, wherein $R_1$ represents —$(CH_2)_n$,

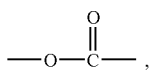

or $O(CH_2)_{n-}$, $R_2$, $R_3$ and $R_4$ each independently represent —H, —$O(CH_2)_{m-1}$—$CH_3$ or

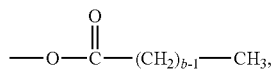

n and m each independently represent an integer of from 1 to 8, $R_5$ represents

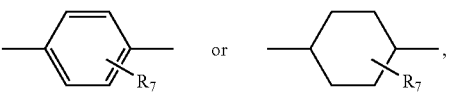

$R_7$ represents —H, —$O(CH_2)_{a-1}$—$CH_3$ or

—O—C(=O)—$(CH_2)_{b-1}$—$CH_3$, a and b each independently represent an integer of from 1 to 8, $R_6$ represents —$O(CH_2)_e$—$CX_2$—$CY_3$, X and Y each independently represent a hydrogen atom or a fluorine atom, and e represents an integer of from 1 to 18

Chemical Formula 5

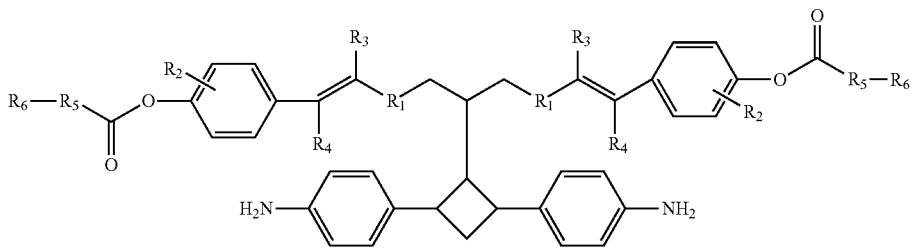

-continued
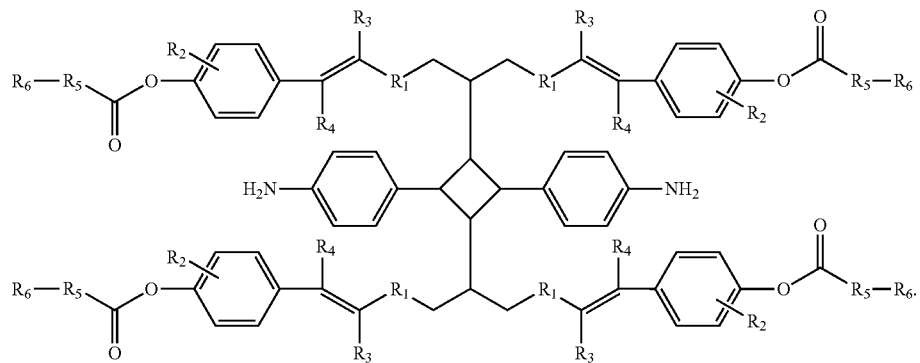
Chemical Formula 6
* * * * *